US006241072B1

United States Patent
Ingraham

(10) Patent No.: US 6,241,072 B1
(45) Date of Patent: Jun. 5, 2001

(54) BOTTLE MANUFACTURING HOPPER SYSTEM

(75) Inventor: Thomas M. Ingraham, Fort Collins, CO (US)

(73) Assignee: Advanced Manufacturing Technology, Fort Collins, CO (US)

( * ) Notice: Subject to any disclaimer, the term of this patent is extended or adjusted under 35 U.S.C. 154(b) by 0 days.

(21) Appl. No.: 09/317,750

(22) Filed: May 24, 1999

(51) Int. Cl.[7] .............................. B65G 1/00; B65G 37/00; B65G 47/24; B65G 43/00; B65G 47/04
(52) U.S. Cl. ...................... 198/347.3; 198/406; 198/416; 198/524
(58) Field of Search ................................. 198/347.3, 406, 198/416, 524

(56) References Cited

U.S. PATENT DOCUMENTS 3,367,534 * 2/1968 Carter, III ......................... 221/68 X
4,401,205 * 8/1983 Komossa et al. ..................... 198/524
5,004,400 * 4/1991 Handke ................................. 414/786
5,494,150 * 2/1996 McDonnell et al. ................. 198/524

FOREIGN PATENT DOCUMENTS

0093806 * 6/1982 (JP) ...................................... 198/524
0096218 * 5/1987 (JP) ...................................... 198/524

* cited by examiner

Primary Examiner—Christopher P. Ellis
Assistant Examiner—Kenneth W Bower
(74) Attorney, Agent, or Firm—Harness, Dickey & Pierce, P.L.C.

(57) ABSTRACT

An object loader system is provided for loading objects from storage into an object processing application. A first conveyor receives the objects from storage, and a second conveyor receives the objects from the first conveyor system at a predetermined location. A sensor determines detection of objects approximately relative to the predetermined location. The first conveyor conveys the objects to the second conveyor based upon the determined detection by the sensor.

16 Claims, 5 Drawing Sheets

BOTTLE MANUFACTURING HOPPER SYSTEM

BACKGROUND AND SUMMARY OF THE INVENTION

The present invention relates generally to bottle manufacturing systems, and more particularly to, bottle manufacturing hopper systems.

Bottle manufacturers strive to use bottles in their system that are substantially free of defects. However, present bottle manufacturing systems typically experience defects in their bottles that arise due to how the bottles are loaded into the system. For example, a present bottle loading system is a silo bottle loading system as depicted in FIG. 1. A silo system, similar to grain elevators, feeds bottles at the top of silo 20 and removes the bottles at the bottom of silo 20 via a belt conveyor 22. Reference numeral 24 depicts the potential fill point for silo 20. Such a system experiences the disadvantage of defects arising from bottles at the bottom of the silo being crushed from the weight of the bottles above. Moreover, bottles occasionally experience dents due to the fall from the top of the silo to the bottom of the silo.

FIG. 2 depicts another present approach to loading bottles in a bottle manufacturing process. This present approach loads bottles from bulk storage 30 into a belt conveyor 32 via a loader belt 34. Bottles are fed into a bottle manufacturing application via conveyor system 36. In this approach, bottles are loaded at the upstream end 38 of belt conveyor 32. One disadvantage with this approach is that with respect to loading efficiency, bottles typically do not form a pile at the downstream end 40 of belt conveyer 32. The bottles are in a substantially flat non-pile arrangement which diminishes the storage advantages of a pile arrangement. The present invention overcomes the aforementioned disadvantages as well as other disadvantages.

In accordance with the teachings of the present invention, an object loader system is provided for loading objects from storage into an object processing application. A first conveyor receives the objects from storage, and a second conveyor receives the objects from the first conveyor system at a predetermined location. A sensor determines detection of objects approximately relative to the first conveyor. The first conveyor conveys the objects to the second conveyor based upon the determined detection by the sensor.

For a more complete understanding of the invention, its objects and advantages, reference should be made to the following specification and the accompanying drawings.

DESCRIPTION OF THE PREFERRED EMBODIMENT

Figure 1:
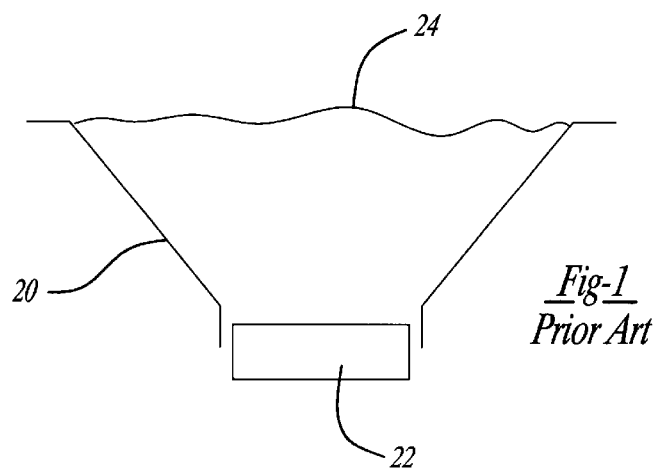
FIG. 1 is a cross-sectional view of a silo bottle loading system that is representative of a prior art bottle loading approach.
Figure 2:
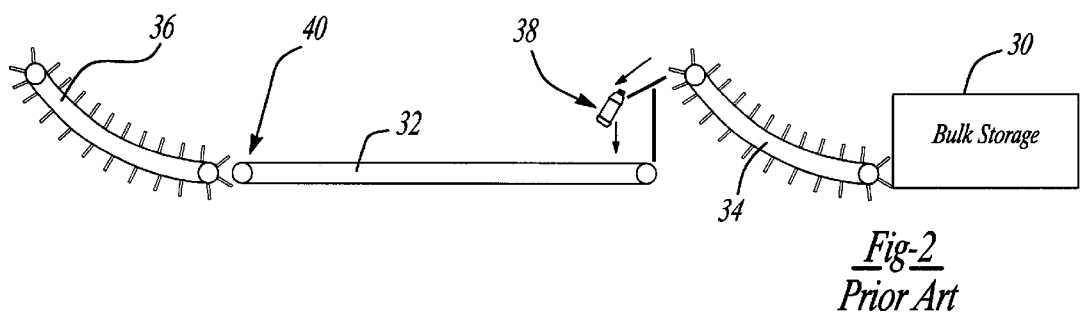
FIG. 2 is a side-view of a second prior art approach to loading bottles in a bottle manufacturing system.
Figure 3:
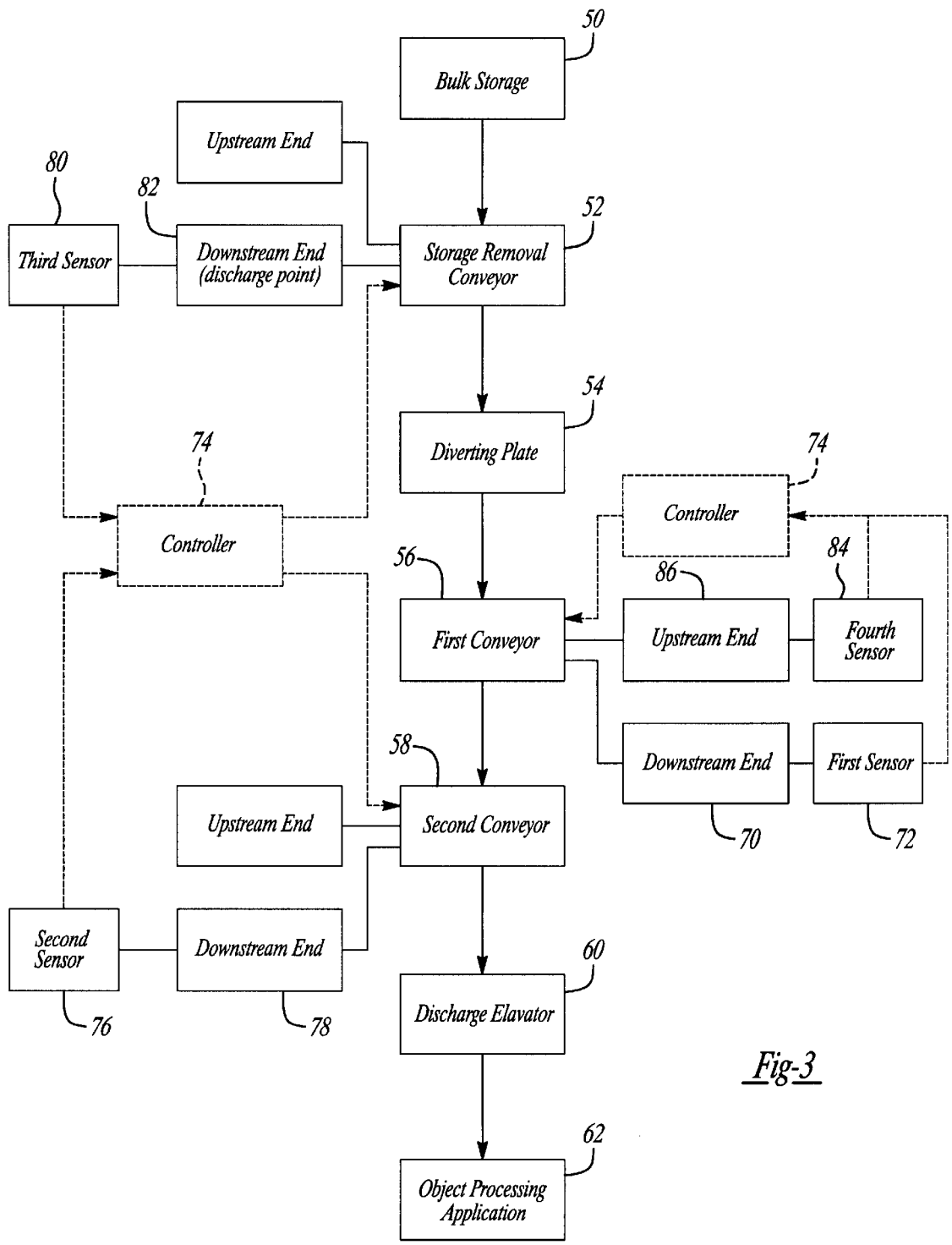
FIG. 3 is a block diagram depicting bottle loading components of the present invention.

FIG. 3 depicts components of a novel bottle loading hopper system. Bottles to be processed by a bottle processing application 62 are stored in bulk storage 50. The present invention is directed to be used in a wide range of bottle processing applications, such as, but not limited to, an application wherein bottles are molded, labeled, and/or palletized. The bottles that are stored in bulk storage 50 include, but are not limited to, polyethylene-based bottles or other types of plastic bottles or metal-based bottles. Although the patent application throughout the figures refers to bottles, the present invention is not limited to only bottles but includes many different types of objects (such as twelve ounce aluminum cans) that are to be loaded into an object manufacturing and processing system.

Bottles are removed from bulk storage 50 via a storage removal conveyor 52. While being conveyed on storage removal conveyor 52, bottles encounter a diverting plate 54 which diverts bottles from storage removal conveyor 52 into a hopper (not shown) that has a first conveyor 56 and a second conveyor 58. Preferably, storage removal conveyor 52 loads the bottles into the hopper at the downstream end 70 of first conveyor 56. First conveyor 56 conveys the bottles to second conveyor 58. Second conveyor 58 conveys the bottles to discharge elevator 60 which then conveys the bottles to the bottle processing application 62.

Due to the present invention's loading of the bottles at the downstream end 70 of first conveyor 56, the bottles form an accumulation (i.e., a pile) at the downstream end of first conveyor 56. The bottles fall from storage removal conveyor 52 substantially on the pile. Preferably, bottles roll down the slope of the bottle pile. However, the bottles do not experience a fall of a great enough distance to significantly dent or damage the bottles. Accordingly, bottles are substantially free of dents due to this novel loading process. The present invention controls the conveyors so that an excessively sized pile is not formed so as to crush or deform the bottles at the bottom of the pile.

Sensors are positioned at certain locations in the system that determine whether bottles are present at those locations. For example, a first sensor 72 is positioned substantially at the downstream end 70 of first conveyor system 56. First sensor 72 provides data to controller 74 as to whether bottles are present approximately at the downstream end 70 of first conveyor system 56. Based upon the data of first sensor 72, controller 74 controls first conveyor 56. The control includes whether first conveyor 56 conveys the bottles towards its downstream end, or whether first conveyor 56 stops, or whether first conveyor 56 reverses its direction so as to convey the bottles to its upstream end, or whether first conveyor 56 increases or decreases its rate of conveying the bottles.

Similarly, controller 74 uses additional sensors to control the conveyors in a preferred manner: a second sensor 76 at the downstream end 78 of second conveyor 58; a third sensor 80 at the downstream end (or discharge point) 82 of storage removal conveyor 52; and a fourth sensor 84 at the upstream end 86 of first conveyor 56. A more detailed description follows of how the controller controls the conveyors based upon the sensor data.

Figure 4:
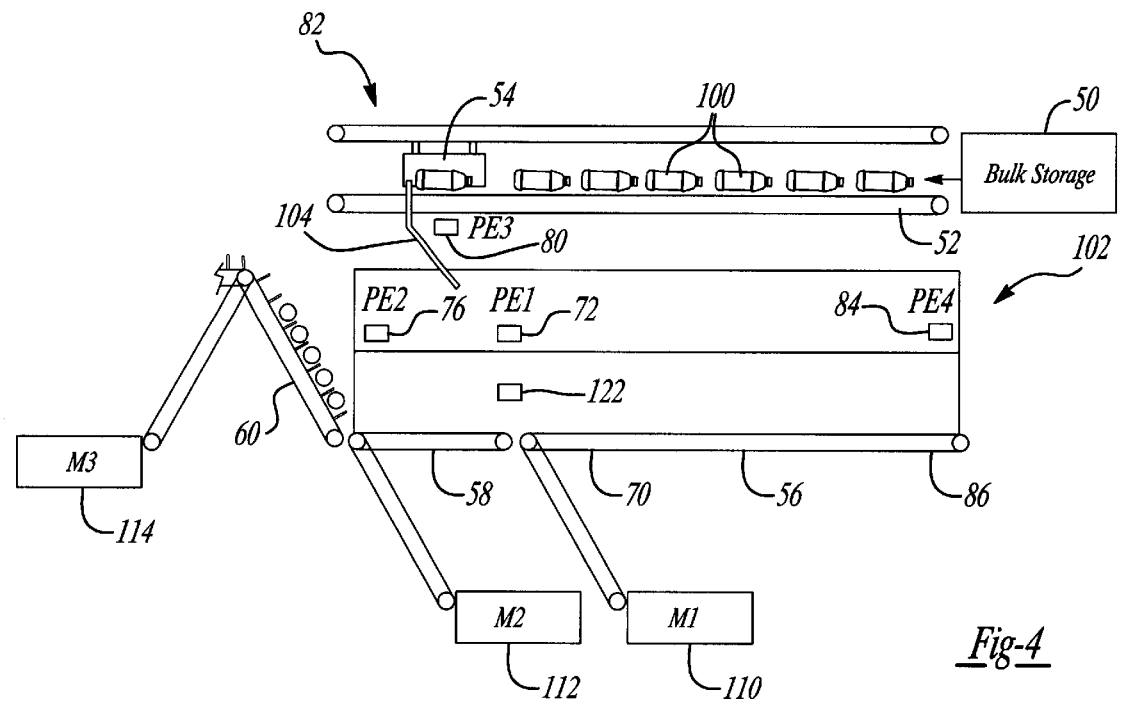
FIG. 4 is a side-view of the bottle loading system of the present invention without bottles being depicted in the hopper.

FIG. 4 is a side-view of one embodiment of the present invention. Bottles 100 are loaded from bulk storage 50 to storage removal conveyor 52. Bottles 100 are conveyed upon storage conveyor 52 until they reach diverting plate 54 which diverts bottles 100 into hopper 102. Diverting plate 54 preferably includes an extension 104 so that the bottles 100 roll down extension 104 into hopper 102. It should be understood that the present invention is not limited to the use of a diverting plate to load bottles into the hopper system, but also includes having the bottles falling from the end of the storage conveyor directly into the hopper.

Bottles 100 enter into hopper 102 approximately at the downstream end of first conveyor 56. It is to be understood that the present invention is not limited to loading bottles into hopper 102 at the downstream end of first conveyor 56, but also includes loading bottles 100 at positions proximate to the downstream end 70 of first conveyor 56.

In one operational mode, first conveyor 56 conveys bottles 100 to second conveyor 58 at the upstream end of second conveyor 58. Second conveyor 58 conveys bottles 100 to discharge elevator 60 so that the bottles can be provided to an object processing application.

In the preferred embodiment, motors are used to power the conveyors. For example, motors 110, 112, and 114 power respectively first conveyor 56, second conveyor 58, and discharge elevator 60. Controller 74 (not shown) controls the operation of motors 110, 112, and 114. The controller controls such operational aspects of the motors as, but not limited to, direction of the conveying, rate of the conveying, and whether a conveyor is running or is stopped.

Sensors are located at various points within hopper 102 in order to determine whether bottles are present at those locations in a sufficient amount to warrant a change in the control of one or more of the conveyors. The following table indicates the preferred locations of the sensors and the type of control that occurs when a particular sensor is in either a covered or uncovered state:

For example, when first sensor 72 is uncovered due to the photoelectric eye sensor 72 not being covered by bottles (i.e., the photoelectric beam being broken by the presence of bottles), motor 110 is controlled such that first conveyor belt 56 conveys bottles 100 forward towards the downstream end of first conveyor 56. It should be understood that the number of sensors needed to realize the advantages of the present invention depends upon the application at hand.

With respect to PE3 80, the bottles falling down do not constitute a "covering" of PE3 80. Rather, PE3 80 is covered when the pile has reached the height of PE3 80 so as to physically cover PE3 80.

The controller of the present invention preferably implements the control of the motors through ladder logic implementation. However, the controller can also be implemented in a microprocessor arrangement as well.

While the preferred embodiment utilizes a photoelectric sensor, the present invention includes utilizing other types of sensors that can determine how bottles are distributed within a hopper system. For example, bottle distribution information can be determined by ultrasonic sensors that can determine the height of a bottle pile at certain locations within the hopper system.

The present invention also includes increasing or decreasing the rate of a conveyor based upon which sensors are covered or uncovered. For example, in this alternate embodiment, a fifth sensor 122 is present at the downstream end of first conveyor 56 at a position relatively lower than the location of first sensor 72 in FIG. 4. When sensor 122 is covered but sensor 72 is not covered, then the rate of first conveyor 56 via motor 110 is decreased at a predetermined rate. In the preferred embodiment, bottles are loaded into the hopper at a rate of 400 bottles per minute. At such a speed, first conveyor 56 normally conveys objects at a rate of 100 bottles per minute. However, when sensor 122 is covered and sensor 72 is not covered, then the rate of first conveyor 56 is reduced by one-half of the normal rate.

In the preferred embodiment, motor 114 for discharge elevator 60 is preferably running or stopped based upon the demand of the downstream equipment (e.g., the equipment of the bottle processing application).

The sensors are preferably placed at the following heights from the level of the first and second conveyors: first sensor 72 and fourth sensor 84 are placed at 6 inches from the level of first conveyor 56; second sensor 76 is placed at 6 inches from the level of second conveyor 58; and third sensor 80 is placed 6 inches from the top of the hopper side. However, it is to be understood that the present invention also includes varying the heights and locations of the sensors so as to still realize the advantages of the present invention.

Figure 5:
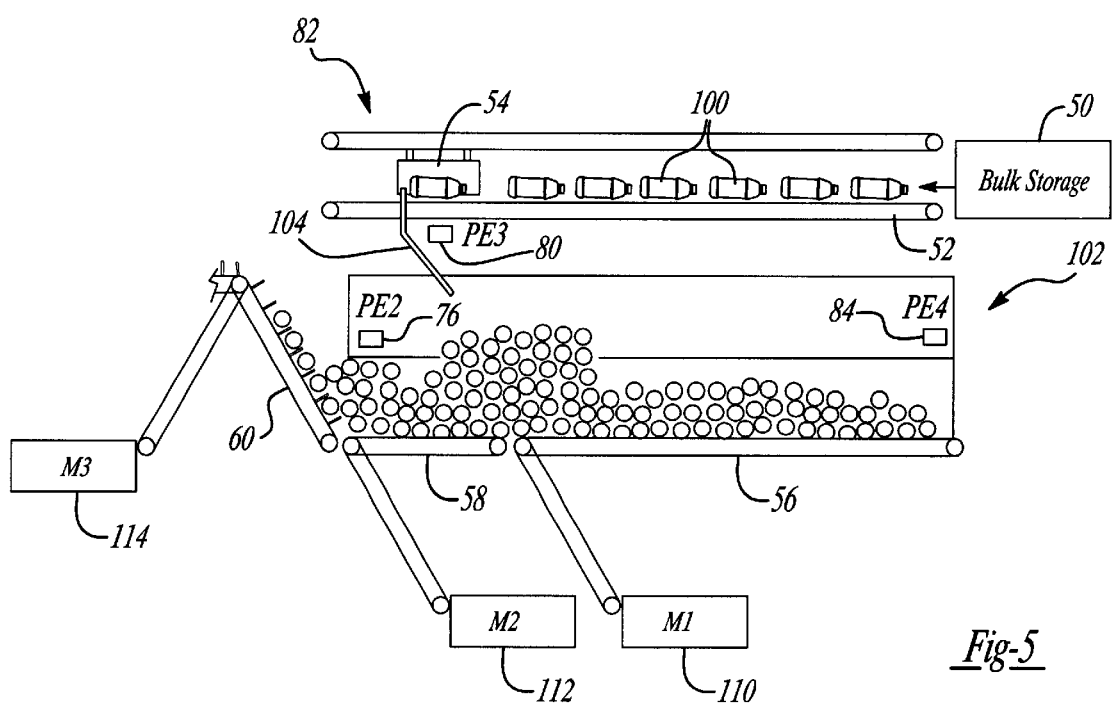
FIG. 5 is a side-view of the bottle loading system of the present invention with bottles being depicted in the hopper in one non-limiting arrangement.

FIG. 5 is a depiction of the present invention with an exemplary non-limiting distribution of the bottles within hopper 102. In this example, sensor 72 (not shown) is covered by bottles 100 while third sensor 80 is uncovered. Accordingly, motor 110 for first conveyor 56 is controlled so that first conveyor 56 is stopped. Motor 112 powers second conveyor 58 so as to convey bottles 100 from the downstream end of first conveyor 56 to the discharge elevator 60. When a sufficient number of bottles have been removed from the discharge end of first conveyor 56, first sensor 72 becomes uncovered, thereby causing motor 110 to power first conveyor 56 in a forward manner. In this way, the present invention allows a pile to substantially remain within the hopper and especially at the downstream end of first conveyor 56 while not overflowing hopper 102 with bottles 100. This approach of the present invention with its ability to maintain a pile within the hopper provides for the advantage of removing bottles more effectively from the system of the present invention in order to satisfy the demand of downstream equipment, while at the same time filling the system based on the supply from the upstream equipment, in an efficient manner and while using the cubic footage of the hopper efficiently.

Figure 6:
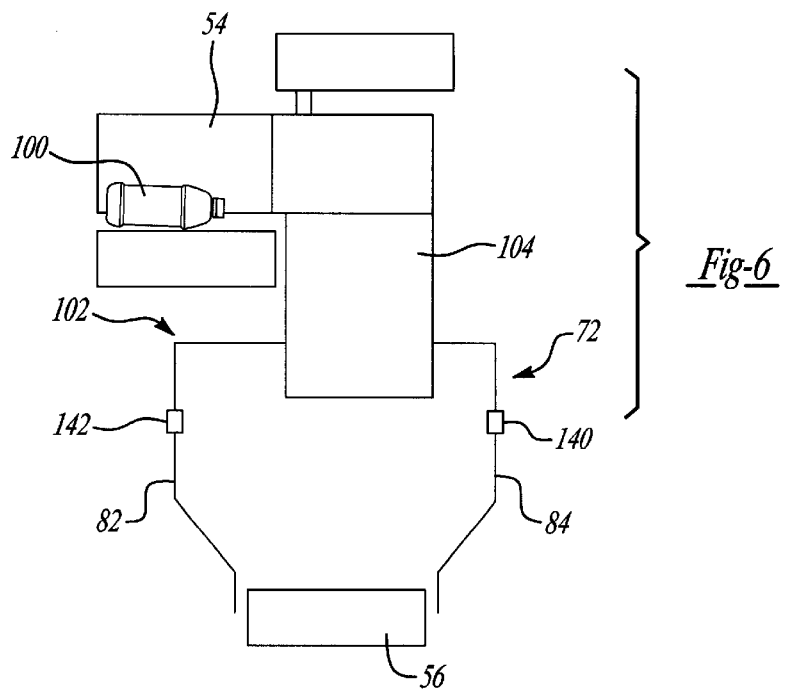
FIG. 6 is a cross-sectional view of the bottle loading system of the present invention.

FIG. 6 depicts a cross-sectional view of the present invention. Diverting plate 54 is shown diverting bottle 100 into hopper 102. Hopper 102 is depicted with a first side 82 and a second side 84 that preferably forms a funnel-like shape that leads bottles to first conveyor 56. Along the substantially vertical sides of hopper 102, are located the appropriate sensors. For example, first sensor 72 is depicted with an emitter 140 and mirror 142 arrangement. Banner Q4S Series photoelectric devices are used in the preferred embodiment.

Figure 7:
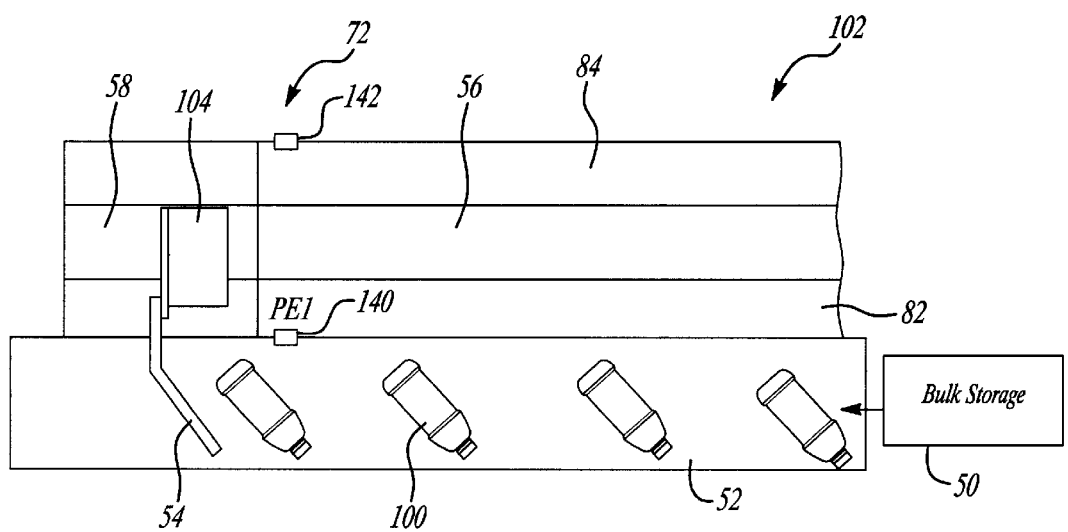
FIG. 7 is a plan view of the preferred embodiment for the bottle loading system of the present invention.

FIG. 7 depicts a plan view of the preferred embodiment of the present invention. Bottles 100 are shown being conveyed via storage removal conveyer 52 from bulk storage 50. Bottles 100 fall into hopper 102 upon contacting diverting plate 54.

Figure 8:
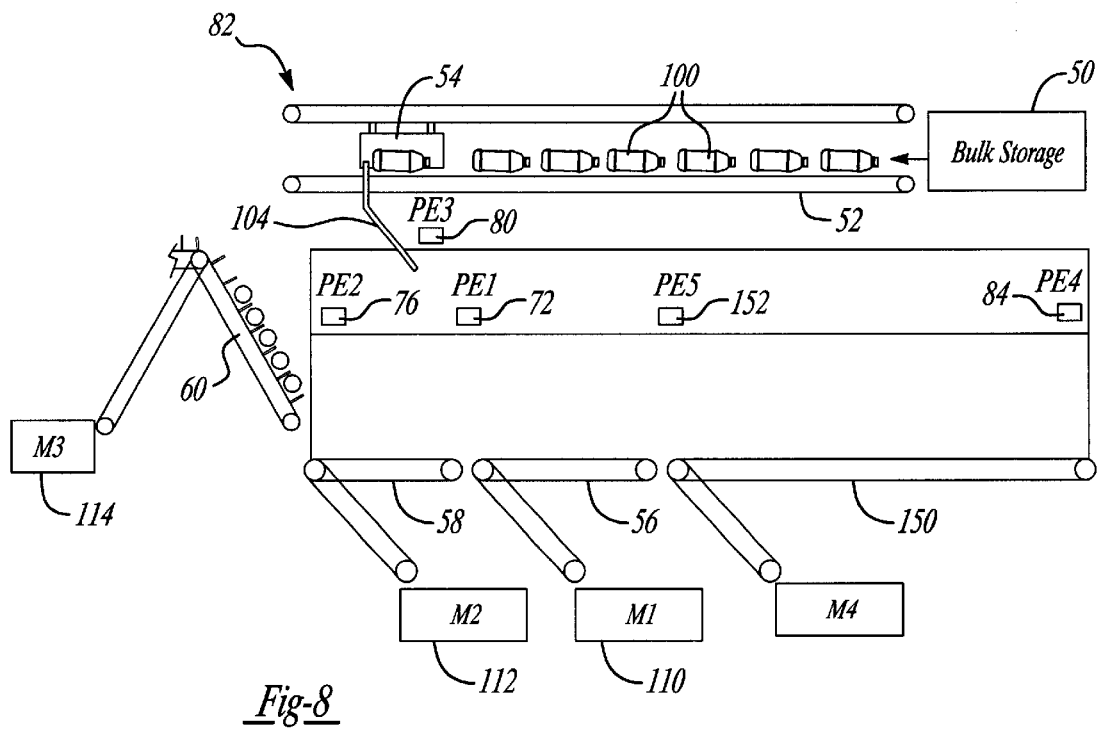
FIG. 8 is a side-view of an alternate embodiment of the bottle loading system of the present invention without bottles being depicted in the hopper.

FIG. 8 is a side-view of an alternate embodiment of the present invention. FIG. 8 is illustrative of the present invention not being limited to only two conveyors nor to four sensors, but includes a wide range of arrangements that are suitable for the application at hand. In this non-limiting example, a three conveyor hopper system is used to convey bottles 100 to discharge elevator 60: first conveyor 56, second conveyor 58, and third conveyor 150. In this alternate embodiment, the following table depicts how the controller of the present invention operates the conveyors based upon which sensors are covered or uncovered.

| Sensor | Preferred Location | Covered | Uncovered |
|---|---|---|---|
| PE1 (72) | Downstream End of First Conveyor | M1 is in stop mode. | M1 is in forward mode. |
| PE2 (76) | Downstream End of Second Conveyor | If PE3 80 is uncovered, then M4 is in stop mode. If PE3 80 is covered, then M4 is in reverse mode. | M4 is in forward mode |
| PE3 (80) | Discharge Point Storage Removal Conveyor | M4 is in reverse mode. | M4 is in stop mode unless PE5 152 is uncovered. |
| PE4 (84) | Upstream End of Third Conveyor | Disable M4 Reverse mode. | Enable M4 reverse mode. |
| PE5 (152) | Downstream End of Third Conveyor | Disable M4 forward mode. | Enable M4 forward mode. |

In still another embodiment, the controller of the present invention includes controlling the storage removal conveyor 52. In this way, the rate at which the bottles are removed from bulk storage is controlled so as to yield better efficiencies in having the hopper convey bottles to the bottle processing application.

Figure 9:
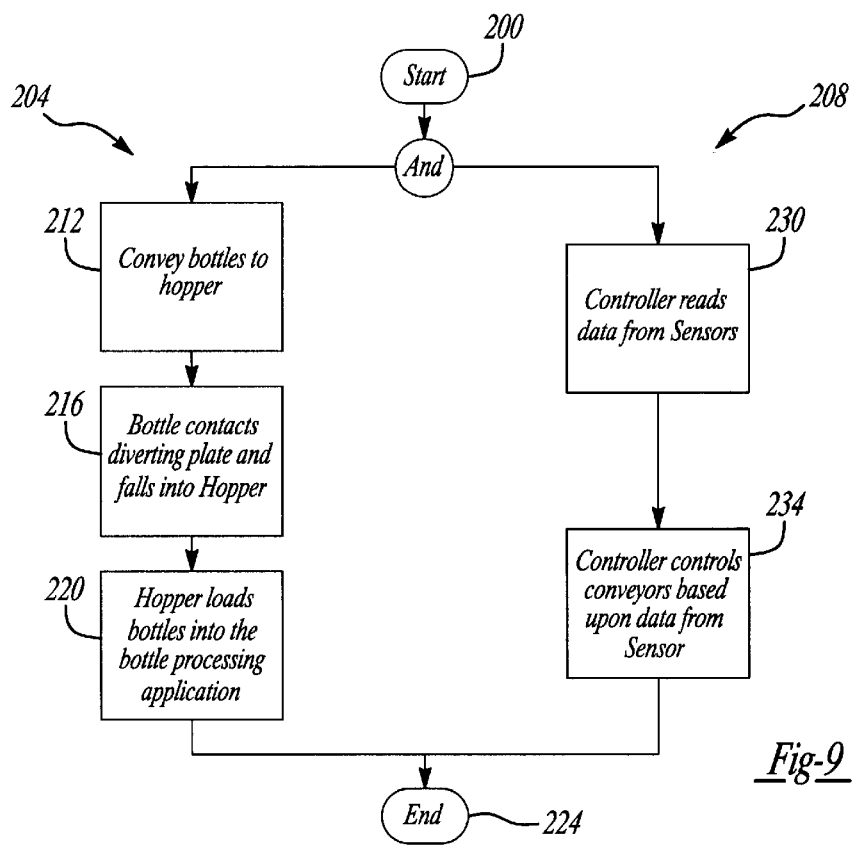
FIG. 9 is a flow chart depicting the operational steps utilized to operate the present invention in a preferred manner.

FIG. 9 is a flowchart depicting the operational steps involved in conveying bottles according to the teachings of the present invention. Start indication block 200 indicates that two paths of operation 204 and 208 operate substantially concurrently relative to each other. Along branch 204, the following steps are performed. At process block 212, bottles are conveyed to the hopper. Process block 216 diverts bottles into the hopper when the bottles contact the diverting plate. Process block 220 includes the hopper loading the bottles into the bottle processing application before having this iteration of operations terminate at end block 224.

With respect to branch 208, process block 230 includes the controller of the present invention gathering data from the sensors in order to determine whether bottles are sufficiently present at predetermined locations within the system of the present invention. At process block 234, the controller of the present invention controls the conveyors based upon the data from the sensor in the manner described above. Processing terminates at end block 224 for this particular iteration.

While the invention has been described in its presently preferred form, it is to be understood that there are numerous applications and implementations for the present invention. Accordingly, the invention is capable of modification and changes without departing from the spirit of the invention as set forth in the appended claims.

It is claimed:

1. An object loader system for loading objects from storage into an object processing application, comprising:

a first conveyor for receiving said objects from said storage;

a second conveyor for receiving said objects from said first conveyor system at a predetermined location; and a first sensor for detecting objects at a predetermined distance from said first conveyor;

said first conveyor conveying said objects to said second conveyor based upon said detection by said first sensor, wherein said second conveyor has an upstream end for discharging said objects in order to be received by said object processing application, said object loader system further comprising a second sensor for detecting objects at a predetermined distance from said discharge end of said second conveyor, said second conveyor conveying said objects towards said discharge end based upon said detection by said second sensor.

2. The object loader system of claim 1 wherein said first conveyor ceases conveying said objects to said second conveyor based upon said first sensor detecting said objects.

3. The object loader system of claim 1 wherein said first sensor includes a photoelectric eye with a state of uncovered or covered, said first conveyor ceasing conveying said objects to said second conveyor based upon said first sensor being covered by at least one of said objects.

4. The object loader system of claim 3 wherein said first conveyor conveys said objects to said second conveyor based upon said first sensor being uncovered by said objects.

5. The object loader system of claim 1 wherein said first sensor includes a photoelectric eye with a state of uncovered or covered, said first conveyor diminishing the rate of conveying said objects to said second conveyor based upon said first sensor being covered by at least one of said objects.

6. The object loader system of claim 5 wherein the rate of said first conveyor conveying said objects to said second conveyor is increased based upon said first sensor being uncovered with respect to said objects.

7. The object loader system of claim 1 wherein said second sensor includes a photoelectric eye with a state of uncovered or covered with respect to said objects, said second conveyor ceasing conveying said objects towards said discharge end based upon said second sensor being covered with respect to objects.

8. The object loader system of claim 7 wherein said second conveyor conveys said objects towards said discharge end based upon said second sensor being uncovered with respect to objects.

9. An object loader system for loading objects from storage into an object processing application, comprising:

a first conveyor for receiving said objects from said storage;

a second conveyor for receiving said objects from said first conveyor system at a predetermined location;

a first sensor for detecting objects at a predetermined distance from said first conveyor;

said first conveyor conveying said objects to said second conveyor based upon said detection by said first sensor;

a storage removal conveyor for conveying said objects from said storage to said first conveyor at approximately a predetermined location; and a diverting plate for diverting the objects from said storage removal conveyor system to said first conveyor.

10. An object loader system for loading objects from storage into an object processing application, comprising:

a first conveyor for receiving said objects from said storage;

a second conveyor for receiving said objects from said first conveyor system at a predetermined location;

a first sensor for detecting objects at a predetermined distance from said first conveyor;

said first conveyor conveying said objects to said second conveyor based upon said detection by said first sensor;

a storage removal conveyor for conveying said objects from said storage to said first conveyor at approximately a predetermined location; and a diverting plate for diverting the objects from said storage removal conveyor system to said first conveyor at approximately said predetermined location.

11. An object loader system for loading objects from storage into an object processing application, comprising:

a first conveyor for receiving said objects from said storage;

a second conveyor for receiving said objects from said first conveyor system at a predetermined location;

a first sensor for detecting objects at a predetermined distance from said first conveyor;

said first conveyor conveying said objects to said second conveyor based upon said detection by said first sensor;

a storage removal conveyor for conveying said objects from said storage to said first conveyor at approximately a predetermined location, wherein said storage removal conveyor has a removal position at which objects are removed from said storage removal conveyor in order to be sent to said first conveyor, and a second sensor for detecting objects approximately relative to said removal position of said storage removal conveyor, said first conveyor conveying said objects to said second conveyor based upon said detection by said second sensor.

12. The object loader system of claim 11 wherein said first conveyor reverses direction of conveying said objects based upon said determined detection by said third sensor.

13. The object loader system of claim 11 wherein said third sensor includes a photoelectric eye with a state of uncovered or covered with respect to said objects, said first conveyor reversing direction of conveying said objects to said second conveyor based upon said third sensor being uncovered with respect to objects.

14. The object loader system of claim 13 wherein said first conveyor ceases conveying said objects to said second conveyor based upon said third sensor being uncovered with respect to objects and said first sensor being covered with respect to said objects.

15. An object loader system for loading objects from storage into an object processing application, comprising:

a first conveyor for receiving said objects from said storage;

a second conveyor for receiving said objects from said first conveyor system at a predetermined location;

a first sensor for detecting objects at a predetermined distance from said first conveyor;

said first conveyor conveying said objects to said second conveyor based upon said detection by said first sensor; wherein said first conveyor has an upstream and downstream end, and a second sensor for detecting objects proximate to said upstream end of said first conveyor, said first conveyor conveying said objects to said second conveyor based upon said detection by said second sensor.

16. The object loader system of claim 15 wherein said fourth sensor includes a photoelectric eye with a state of uncovered or covered with respect to said objects, said first conveyor ceasing conveying said objects towards said downstream end based upon said fourth sensor being covered with respect to objects.

| Sensor | Preferred Location | Covered | Uncovered |
|---|---|---|---|
| PE1 (72) | Downstream End of First Conveyor | If PE3 is uncovered, then M1 is in stop mode. | M1 is in forward mode. |
| PE2 (76) | Downstream End of Second Conveyor | M2 is in stop mode. | M2 is in forward mode. |
| PE3 (80) | Discharge Point of Storage Removal Conveyor | M1 is in reverse model | M1 is in forward mode or stop mode based on PE1 (72) |
| PE4 (84) | Upstream End of First Conveyor | Disable reverse mode of M1. | Enable reverse mode of M1. |

* * * * *